Figures 1, 2:
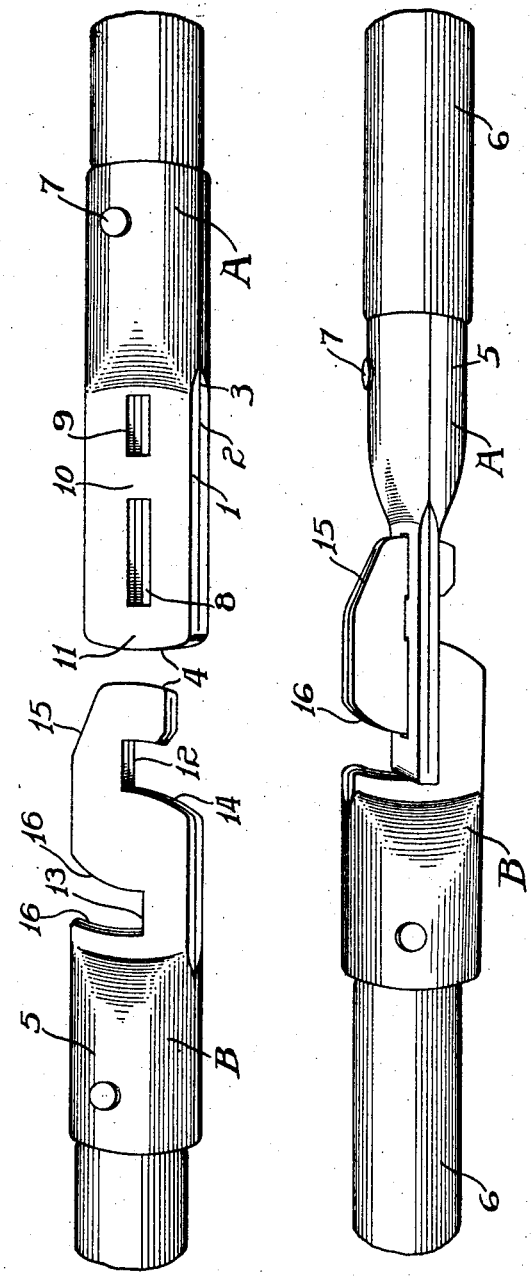

Nov. 19, 1929.  A. M. SEEGER  1,736,373
ROD COUPLING
Filed March 21, 1927

Inventor
Adolph M. Seeger
By Owen & Owen
Attorneys

Patented Nov. 19, 1929

1,736,373

UNITED STATES PATENT OFFICE

ADOLPH M. SEEGER, OF TOLEDO, OHIO, ASSIGNOR TO THE SEEGER DEVICE COMPANY, OF TOLEDO, OHIO, A CORPORATION OF OHIO

ROD COUPLING

Application filed March 21, 1927. Serial No. 176,850.

This invention relates to couplings, but more particularly to couplings for conduit or sewer rods, although the invention is useful in a variety of places and situations, as will readily appear from the following description.

An object of this invention is to provide a coupling, the parts of which may be readily and conveniently connected together and disconnected, and, when in interlocking relation, effectually withstands pushing, pulling and torsional forces.

Another object is to provide a coupling which may be cheaply manufactured without sacrificing features of strength and durability.

A further object is to provide a coupling having the new and improved features of construction and arrangement hereinafter described.

Fig. 1 is a perspective view of the coupling parts disengaged; and Fig. 2 is an elevation of the coupling parts in interlocking engagement.

The coupling shown for illustrative purposes is composed of two parts or members A and B. Each coupling member consists of a plurality of parallel metal sheets 1 and 2 in contact with each other and having their line of division 3 disposed in a plane parallel with the direction of pushing and pulling forces exerted on the coupling when in interlocking relation. This constructional feature materially enhances the strength of the coupling, enabling it effectually to withstand relatively great stresses and strains longitudinally, laterally and twisting or torsional actions.

As shown, each part is made up of a single piece of sheet metal bent or folded upon itself at the outer edge 4. The opposite end portions of the parts A and B are shaped to provide rounded portions 5 to receive an end of a rod 6, which is securely held thereto by a rivet 7. The rivet 7 also functions to hold the metal sheets or strips together.

The part A is formed with longitudinally spaced elongate openings 8 and 9 which are positioned midway of the side edges of the flattened end portions, and the opening 8 is approximately twice the length of the opening 9. The arrangement of the openings 8 and 9 is such as to provide an abutment surface 10 between the openings 8 and 9 and an abutment surface 11 between the outer end of the opening 8 and the edge of the outer end of the coupling member.

The coupling member B is also formed with a flattened outer end portion. A hook 12 is formed adjacent the outer end of the member B and a hook 13 is provided adjacent the rounded rod-attaching portion 5. The hooks 12 and 13 face in opposite directions and the side 14 of the hook 12 is rounded or beveled for permitting ready engagement of the parts. The upper surface 15 of the hook 12 is also beveled to assist in the engagement and disengagement of the parts. It will further be noted that the sides 16 of the hook 13 are curved outwardly toward the outer end of the member B for a similar purpose.

In interengaging the coupling members, the outer end portion of the hook 12 is inserted through the opening 8 of the member A and inserted through the opening 9 so that the inside of the hook 12 engages the top of the abutment surface 10 of the coupling member A. Thereafter by swinging the member B upwardly the inside of the hook 13 engages the underside of the abutment surface 11 to bring the coupling members into the same longitudinal plane. It will be noted that the outer leg of the hook 12 is shorter than the width of the member B to be out of the way and not to catch in obstructions when being forced through conduits. When the members are engaged they do not fit tightly together, but loosely to permit a slight amount of play.

Disengagement of the coupling members A and B may be readily effected by an operation reverse to that heretofore described, and although the parts may be readily and conveniently disengaged, it is manifest that when the parts are interengaged an exceptionally sturdy and reliable coupling is provided which cannot accidentally become separated, but will withstand exceedingly great stresses and strains, both torsional and in a longitudinal direction.

It will be seen that I have provided a construction which satisfies the objects enumerated above, and one which constitutes a valuable advance in the art. While I have shown the invention in a certain physical embodiment, it is to be understood that modifications of the structure shown may be made by those skilled in this art without departing from my invention as expressed in the following claim.

What I claim as new and desire to secure by Letters Patent is:

A coupling including a pair of members each formed of a substantially rectangular strip, one of said members being provided with a pair of longitudinally spaced substantially rectangular openings in proximity to an end thereof, the outer opening being of greater length than the inner opening, the other member being formed with a pair of longitudinally spaced U-shaped openings in and at substantially right angles to the respective side edges, which openings face in opposite directions and form a pair of hooks, the distance between said U-shaped openings being slightly less than the length of said outer rectangular opening, the outer hook being receivable in the several rectangular openings and being of a width so as to conformably engage in the inner opening, the distance between the free end of the first named member and the outer end edge of the longer rectangular opening being slightly less than the width of the inner U-shaped opening, said rectangular openings extending transversely through the first named member whereby in coupled position the members occupy a right-angular relation.

In testimony whereof I have hereunto signed my name to this specification.

ADOLPH M. SEEGER.